United States Patent
Hanks

(10) Patent No.: US 6,662,748 B1
(45) Date of Patent: Dec. 16, 2003

(54) LITTER BOX APPARATUS

(76) Inventor: Robert Hanks, 490 Texas Ave., Bridge City, TX (US) 77611

( * ) Notice: Subject to any disclaimer, the term of this patent is extended or adjusted under 35 U.S.C. 154(b) by 0 days.

(21) Appl. No.: 10/201,037

(22) Filed: Jul. 23, 2002

(51) Int. Cl.$^7$ ............................................. A01K 29/00
(52) U.S. Cl. ..................... 119/170; 119/166; 119/165
(58) Field of Search ........................... 119/170, 166, 119/165, 161; 220/495.06, 495.08, 908.1, 908.3, 757, 769; 280/47.26

(56) References Cited

U.S. PATENT DOCUMENTS

| | | | | |
|---|---|---|---|---|
| 2,308,398 A | * | 1/1943 | Stevens | 220/495.11 |
| 3,321,103 A | * | 5/1967 | Phillips | 141/314 |
| 3,737,920 A | * | 6/1973 | Savee | 4/484 |
| 3,771,493 A | * | 11/1973 | Chandor | 119/170 |
| 3,818,865 A | * | 6/1974 | Sinclair | 119/161 |
| 3,831,557 A | * | 8/1974 | Elesh | 119/170 |
| 4,111,157 A | * | 9/1978 | Haugen | 119/165 |
| 4,299,190 A | | 11/1981 | Rhodes | |
| 4,352,340 A | | 10/1982 | Strubelt | |
| 4,788,935 A | | 12/1988 | Bella et al. | |
| 4,813,376 A | * | 3/1989 | Kaufman et al. | 119/168 |
| 4,951,605 A | | 8/1990 | Brown | |
| 5,134,974 A | * | 8/1992 | Houser | 119/168 |
| 5,165,564 A | * | 11/1992 | Prout et al. | 220/254.1 |
| 5,402,751 A | | 4/1995 | Chevrotiere | |
| 5,511,682 A | * | 4/1996 | Pace | 280/47.26 |
| 5,575,238 A | | 11/1996 | Redman | |
| 5,601,052 A | | 2/1997 | Rood et al. | |
| 5,642,814 A | * | 7/1997 | Nelson | 209/235 |
| 5,823,137 A | | 10/1998 | Rood et al. | |
| 5,842,595 A | * | 12/1998 | Williams | 220/495.11 |
| 5,899,468 A | * | 5/1999 | Apps et al. | 280/47.26 |
| 5,915,584 A | * | 6/1999 | Sposit et al. | 220/495.09 |
| 6,027,541 A | * | 2/2000 | Siemers | 55/429 |
| 6,135,057 A | | 10/2000 | Cummings | |
| 6,149,168 A | * | 11/2000 | Pauser et al. | 280/47.371 |
| 6,505,578 B1 | * | 1/2003 | Scott et al. | 119/867 |
| 2002/0066736 A1 | * | 6/2002 | Pyles | 220/495.08 |

FOREIGN PATENT DOCUMENTS

| | | | | |
|---|---|---|---|---|
| EP | 372659 A1 | * | 6/1990 | A01K/1/01 |
| EP | 930135 A2 | * | 7/1999 | B25H/3/02 |

* cited by examiner

Primary Examiner—Peter M. Poon
Assistant Examiner—Joan M. Olszewski
(74) Attorney, Agent, or Firm—Harrison & Egbert

(57) ABSTRACT

A litter box apparatus having a container with an open top and a closed bottom, a lid detachably affixed over the open top of the container and having a hole formed therein, a handle affixed to the container and extending outwardly beyond the lid, and a pair of wheels rotatably mounted adjacent to the closed bottom in a location directly below the handle. A liner having a bag shape is received within the container. At least one support member is affixed to the lid and extends into the container so as to retain the liner adjacent to a side wall thereof.

11 Claims, 2 Drawing Sheets

LITTER BOX APPARATUS

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to cat litter boxes. More particularly, the present invention relates to transportable litter boxes that can be easily filled with cat litter and cleaned of the cat litter.

BACKGROUND OF THE INVENTION

House pets, and particularly cats, when confined inside a dwelling for an extended period, require sanitary litter facilities for depositing and containing excrement. Such facilities are known to comprise a receptacle in the nature of a tray partially filled with an absorbent material, typically a particulate clay compound.

Such receptacles pose a number of problems to the householder. The absorbent litter, while suitable for absorbing pet urine, does not typically absorb any substantial portion of the obnoxious odors produced by the excrement of house pets. These odors escape into the surrounding area and become an annoyance to the homeowner and other inhabitants of the dwelling. The sight of soiled litter in a tray is distasteful to inhabitants of the dwelling.

Moreover, pets frequently instinctively attempt to bury their excrement, and in the process often end up broadcasting litter beyond the confines of the tray, where it can become entrapped in carpet fibers. Once litter has migrated into carpeting, it is generally very difficult to remove, reducing the life of carpeting and often adding to the obnoxious odors tending to pervade the area of the dwelling surrounding the receptacle. Such stray litter particles can also be transported to other areas of the dwelling in the treads of shoes, increasing the difficulty of keep the dwelling clean.

Furthermore, in order to retain such receptacle in a sanitary condition and minimize obnoxious odors emanating therefrom, the absorbent litter must be changed regularly. This involves periodically disposing of soiled litter and replacing it with unsoiled litter, a distasteful and messy chore which involves unpleasantly close contact with pet litter soiled by animal excrement. In fact, direct handling of soiled litter poses a danger to women of contacting toxoplasmosis during pregnancy. The receptacle itself must be cleaned with a disinfecting cleaner for maximum sanitization, otherwise a residue of soiled litter particles will adhere to the receptacle walls when the litter is changed, contaminating the fresh litter.

Additionally, most commonly used pet litter contains a very fine particulate element which, when the litter is disturbed, billows into the air, to be inhaled by the unfortunate householder charged with changing the litter before settling all over the surrounding areas.

In the past, various patents have issued for various types of litter box apparatus. For example, U.S. Pat. No. 4,299, 190, issued on Nov. 10, 1981 to A. Rhodes, describes a litter box with a mechanism for replacing fouled litter which includes a base member supporting a housing for rotation about a transverse axis. The housing includes an open topped lower litter box section and an open bottom upper storage box section in end-to-end engagement with the lower section. A plastic garbage bag is housed in the storage section with its opening border clamped between the confronting faces of the upper and lower sections and a pair of opposed flaps supported by opposite faces of the storage box.

U.S. Pat. No. 4,352,340, issued on Oct. 5, 1982 to J. R. Strubelt, describes a disposable litter device which includes a shell having a removable lid and an access aperture to the side of the shell. A disposable bag is disposed in the shell and held in place within the shell by the lid. A ring is secured to the bag in the vicinity of the aperture.

U.S. Pat. No. 4,788,935, issued on Dec. 6, 1988 to Bella et al., describes a reformable carton and cat litter housing assembly which is made up of a precut and scored sheet of paperboard which is folded initially into a compact shipping carton containing litter and a plastic bag. The carton is partially unfoldable into a support structure having bottom, side and end walls. The support structure is insertable into the bag.

U.S. Pat. No. 4,951,605, issued on Aug. 28, 1990 to F. Brown, describes a litter disposal system which comprises a receptacle including a bag and a tray, and a support structure for supporting the bag in a suspended position. The bag is formed with opposed flap portions adapted to be engaged to securing pegs depending from a top frame of the support structure.

U.S. Pat. No. 5,402,751, issued on Apr. 4, 1995 to J. F. De La Chevrotiere, describes another pet litter box having a built-in filter. This litter box comprises a base portion which has a litter receiving area and a cover portion which has a screen member attached thereto. The screen member extends below the underside of the cover and is spaced therefrom to define a waste receiving pocket between the underside of the cover and the screening member.

U.S. Pat. No. 5,575,238, issued on Nov. 19, 1996 to R. S. Redman, describes a furniture-like litter box housing in the form of various types of household furniture. The purpose of the housing is to conceal the cat litter box in the home environment. The housing has a rear entrance that is concealed from view. The bottom can have a wheel set up in each corner so as to assist in the stabilization and mobilization of the litter box.

U.S. Pat. No. 5,601,052, issued on Feb. 11, 1997 to Rood et al., describes a litter box assembly having an open base portion with a litter holding wing portion extending upwardly therefrom and a removable sifting device disposed therein. The sifting device is disposed between a layer of loose litter material. The sifting device is removable from the base portion to remove clumped and fecal matter therefrom while permitting loose litter material to pass therethrough. U.S. Pat. No. 5,823,137, issued on Oct. 20, 1998 to the same inventors, describes a different type of pivotable sifting device for the litter box.

U.S. Pat. No. 6,135,057, issued on Oct. 24, 200 to B. D. Cummings, describes a litter box which has a base and a snap-on lid. The lid has a recessed opening therethrough to provide access within the litter box. The interior of the lid can include an odor-reducing filter. A removable, disposable liner is provided on the interior of the base so as to facilitate disposal of used litter.

It is an object of the present invention to provide a litter box apparatus that can be easily moved from place to place.

It is another object of the present invention to provide a litter box which is pivotable so as to have one orientation for the filling of the litter box and another orientation for use by the pet.

It is a further object of the present invention to provide a litter box apparatus whereby the pet litter can be maintained on a generally flat surface.

It is a further object of the present invention to provide a litter box apparatus which is substantially closed so as to avoid dispersal of cat litter and the odors associated therewith.

It is still a further object of the present invention to provide a cat litter box which is easy to use, relatively inexpensive and easy to manufacture.

These and other objects and advantages of the present invention will become apparent from a reading of the attached specification and appended claims.

BRIEF SUMMARY OF THE INVENTION

The present invention is a litter box apparatus that comprises a container having an open top and a closed bottom, a lid detachably affixed over the open top of the container and having a hole formed therein, a handle affixed to the container and extending outwardly beyond the lid, and a pair of wheels rotatably mounted adjacent the closed bottom in a location directly below the handle. The container has a first side wall extending between the top and the bottom and an opposite second side wall.

The pair of wheels have a periphery spaced outwardly beyond the first side by a distance generally equal to a distance that the handle extends outwardly beyond the first side wall. The handle has a generally inverted U-shaped configuration. This inverted U-shaped configuration is telescopically mounted to the container.

At least one support member is affixed to the lid and extends into the container. The support member is, in the preferred embodiment of the present invention, a bent rod extending in proximity to the second side wall. In particular, the support member of the present invention includes a first support member affixed to the lid and extending into the container so as to have a portion adjacent the second side wall, a second support member affixed to the lid and extending into the container on one side of the first support member, and a third support member affixed to the lid and extending into the container on an opposite side of the first support member.

In the present invention, a flexible bag-shaped liner is received within the interior of the container. This liner has an upper edge interposed between the lid and the periphery of the open top. The support member extends into the liner so as to retain the liner in proximity to the second side wall. A quantity of cat litter can be received within the liner. A grip is affixed to an exterior of the second side wall adjacent to the closed bottom. This grip extends outwardly from the second side wall.

In the present invention, the container is set upright on its wheels. The lid can then be removed and a garbage bag placed into the litter box so as to be draped around the periphery of the open top. Cat litter is then poured into the garbage bag and the lid is replaced thereover. The container is then tipped onto its side so that the handle and the wheels support the first side wall in generally parallel horizontal relationship to the underlying floor. The wheel can then be lifted slightly or otherwise manipulated to level out the cat litter within the container.

In order to empty the container, the container is pivoted about the wheels so as to be in an upright orientation and the lid is removed. The garbage bag containing the cat litter can then be closed. The container can then be wheeled to an exterior environment and the garbage bag lifted out of the container for disposal.

DETAILED DESCRIPTION OF THE INVENTION

Figure 1:
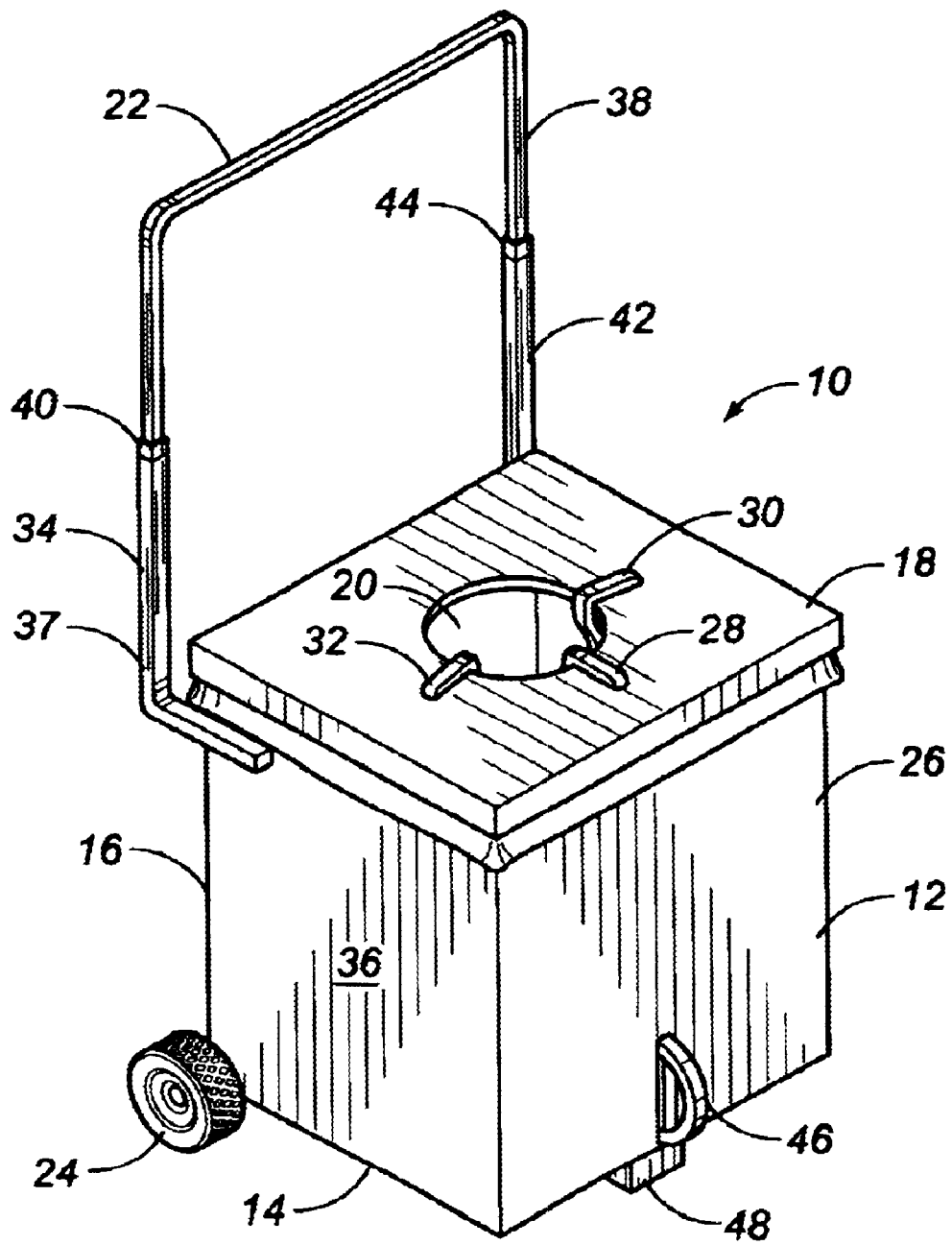
FIG. 1 is a perspective view of the litter box apparatus of the present invention.

Referring to FIG. 1, there is shown the litter box apparatus 10 in accordance with the teachings of the preferred embodiment of the present invention. The litter box apparatus 10 includes a container 12 having an open top and a closed bottom 14. A first side wall 16 extends between the open top and the bottom 14. A lid 18 is detachably affixed over the open top of the container 12. The lid 18 has a hole 20 formed therein. A handle 22 is affixed to the container 12 and extends outwardly beyond the lid 18. A pair of wheels 24 are rotatably mounted adjacent to the closed bottom 14 of the container 12 at a location directly below the handle 22.

In the present invention, the container 12 has a generally cubic configuration. In particular, there is a first side wall 16, a second side wall 26 and a pair of end walls extending between the side walls 16 and 26.

The lid 18 has a generally circular opening 20 formed therein. The lid 18 has a first support member 28 affixed to the lid 18 and extending through the hole 20 into the interior of the container 12. Similarly, a second support member 30 is affixed to the lid 18 and also extends into the container 12 on one side of the first support member 28. Additionally, a third support member 32 is affixed to the lid 18 and extends into the hole 20 and into the interior of the container 12 on an opposite side of the support member 28 from the support member 30. The support members are designed so as to properly retain a liner in a desired orientation within the interior of the container 12. The hole 20 should have a diameter suitable for allowing a pet, or other animal, to enter therethrough into the interior of the container 12 and to access the cat litter within the interior of the container 12.

Handle 22 has one side 34 affixed to the end wall 36 of the container 12 just below the lid 18. A first L-shaped arm 37 extends upwardly from the container 12 so as to receive an inverted U-shaped configured handle portion 38 therein. Telescoping mechanism 40 is provided on side 34 so as to allow for the telescoping movement of the inverted U-shaped handle 38. Similarly, the handle 22 includes another side 42 which is affixed to the opposite end wall from end wall 36. A similar telescoping mechanism 44 is located on side 42 to facilitate the telescoping movement of the handle 38. As can be seen, the L-shaped portions of handle 22 extend outwardly beyond the side wall 16 for a given distance.

The pair of wheels 24 is mounted so as to have a portion extending below the bottom 14 of container 12 and a portion extending outwardly beyond the side wall 16 of container 12. Each of the pair of wheels 24 has a periphery spaced outwardly beyond the first side 16 by the same distance that the handle 22 extends outwardly beyond the first side 16. As a result, when the apparatus 10 is tilted about the wheels 24, the side 16 will be horizontally oriented when the handle 22 rests on a flat surface.

A gripping member 46 is mounted on the side 26 generally adjacent to the closed bottom 14 of container 12. Gripping member 46 facilitates the ability of the user to level the litter within the interior of the container 12. A support pad 48 is affixed to the bottom 14 so as to maintain the bottom 14 in a generally level configuration.

Figure 2:
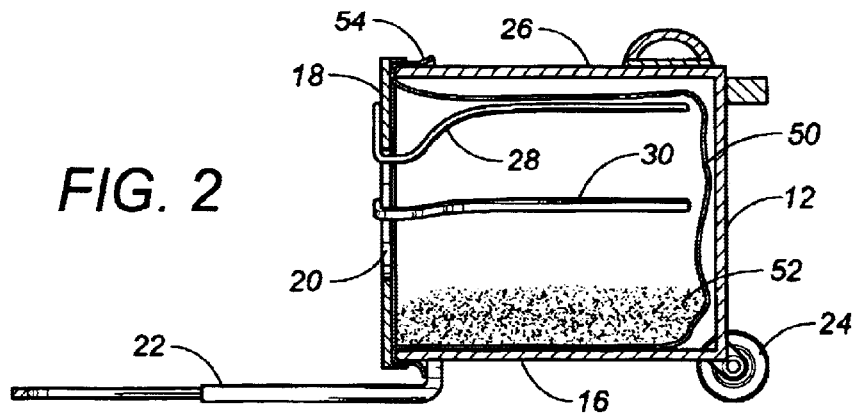
FIG. 2 is a cross-sectional side view of the litter box apparatus of the present invention in its tilted condition for use by an animal.

FIG. 2 shows the interior of the container 12. In FIG. 2, a liner 50 is positioned on the interior of the container 12. The liner 50 is in the nature of a garbage bag. A quantity of cat litter 52 is illustrated in its normally used position within the liner 50 and as residing on the liner surface adjacent to the side wall 16. The liner 50 has an upper edge 54 which is interposed between the inner surface of the lid 18 and the exterior surface of the container 12 adjacent to the open top of the container. Support members 28 and 30 are configured so as to retain the liner 50 in proximity to the second side wall 26. Without the support members 28 and 30, there would be a tendency of the liner 50 to collapse upon the litter 52 and upon any animal within the interior of the container 12. The support member 28 is in the form of a bent rod which will cause the surface of the liner 50 to be interposed between the support member 28 and the interior surface of side wall 26. The support members 28, 30 and 32 are designed so as to maximize the volume of the interior of the liner 50 within the container 12.

In FIG. 2, it can be seen that the handle 22 is laid in a generally flat orientation. The pair of wheels 24 will also support the first side 16 in a generally horizontal orientation. As a result, when the container 12 is pivoted about the wheel 24, the handle 22 will rest on the floor so as to maintain the cat litter 52 in a flat orientation upon the floor.

Figure 3:
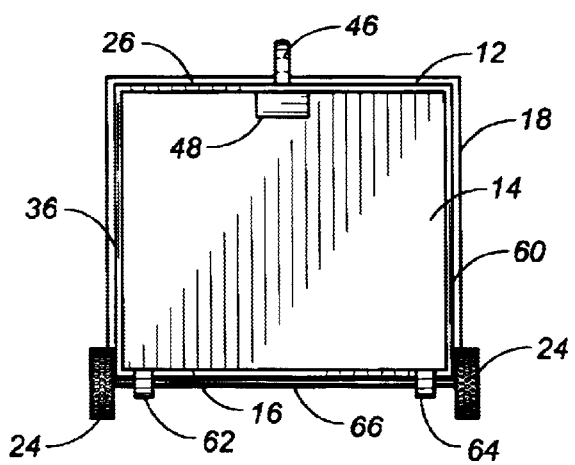
FIG. 3 is a bottom view of the litter box apparatus of the present invention.

FIG. 3 shows the configuration of the wheels 24 as located on the bottom 14 of container 12. The wheels 24 extend outwardly beyond the end walls 36 and 60. Suitable bearing supports 62 and 64 retain axle 66 in parallel relationship to both the bottom 14 of container 12 and to the side wall 16. The wheels 24 are rotatable about axle 66.

FIG. 3 also shows that the gripping member 46 extends outwardly from side wall 26. Support pad 48 is positioned adjacent to the side wall 26 on the bottom 14 of container 12.

Figure 4:
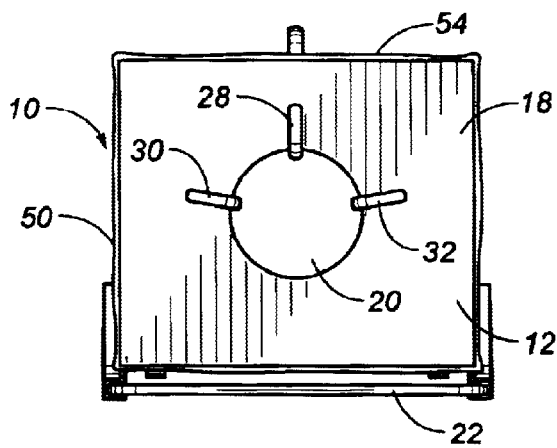
FIG. 4 is a plan view of the litter box apparatus of the present invention.

FIG. 4 shows the plan view of the apparatus 10 of the present invention. In FIG. 4, it can be seen how the support members 28, 30 and 32 are configured so as to extend into the hole 20. The upper edge 54 at the open top of the liner 50 slightly extends outwardly beyond the bottom edge of the lid 18. The handle 22 extends outwardly so as to support the container 12 in a flat orientation.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A litter box apparatus comprising:

a container having an open top and a closed bottom, said container having a first side wall extending between said top and said bottom, said container having a second side wall opposite said first side wall;

a lid detachably affixed over said open top of said container, said lid having a hole formed therein;

a handle affixed to said container and extending outwardly beyond said lid;

a pair of wheels rotatably mounted adjacent said closed bottom in a location directly below said handle; and at least one support member affixed to said lid and extending into said container in general proximity to said second side wall, the support member being a bent rod.

2. The apparatus of claim 1, said pair of wheels having a periphery spaced outwardly beyond said first side wall by a distance generally equal to a distance that said handle extends outwardly beyond said first side wall.

3. The apparatus of claim 2, said handle having a generally inverted U-shaped configuration.

4. The apparatus of claim 3, said inverted U-shaped configuration of said handle being telescopically mounted to said container.

5. The apparatus of claim 1, the support member comprising:

a first support member affixed to said lid and extending into said container so as to have a position adjacent said second side wall;

a second support member affixed to said lid and extending into said container on one side of said first support member; and a third support member affixed to said lid and extending into said container on an opposite side of said first support member.

6. The apparatus of claim 1, further comprising:

a flexible bag-shaped liner received within said container.

7. The apparatus of claim 6, further comprising:

a quantity of cat litter received within said liner.

8. The apparatus of claim 6, said liner having an upper edge interposed between said lid and an exterior periphery of said open top.

9. The apparatus of claim 1, further comprising:

a flexible bag-shaped liner received within said container, the support member extending into said liner so as to retain said liner in proximity to said second side wall.

10. The apparatus of claim 1, further comprising:

a grip member affixed to an exterior of said second side wall adjacent said closed bottom, said grip member extending outwardly from said second side wall.

11. The apparatus of claim 1, said container having a generally cubic configuration.

* * * * *